J. JOHNSON.
Adjustable Harness-Pad.

No. 220,846. Patented Oct. 21, 1879.

WITNESSES:
Henry N. Miller
C. Sedgwick

INVENTOR:
J. Johnson
BY
ATTORNEYS.

UNITED STATES PATENT OFFICE.

JACOB JOHNSON, OF ASHLAND, NEBRASKA, ASSIGNOR TO T. JAY CHASTAIN, OF SAME PLACE.

IMPROVEMENT IN ADJUSTABLE HARNESS-PADS.

Specification forming part of Letters Patent No. 220,846, dated October 21, 1879; application filed March 15, 1879.

*To all whom it may concern:*

Be it known that I, JACOB JOHNSON, of Ashland, in the county of Saunders and State of Nebraska, have invented a new and Improved Adjustable Harness-Pad, of which the following is a specification.

Figure 1:
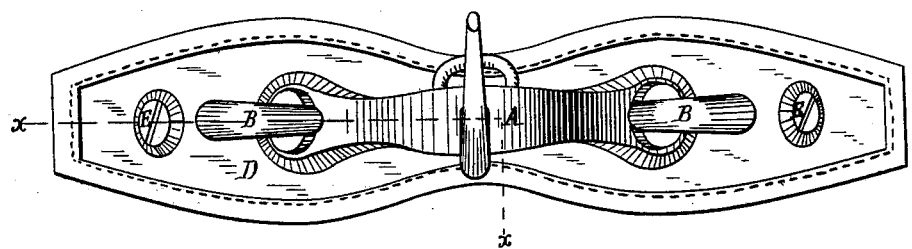
Figure 2:
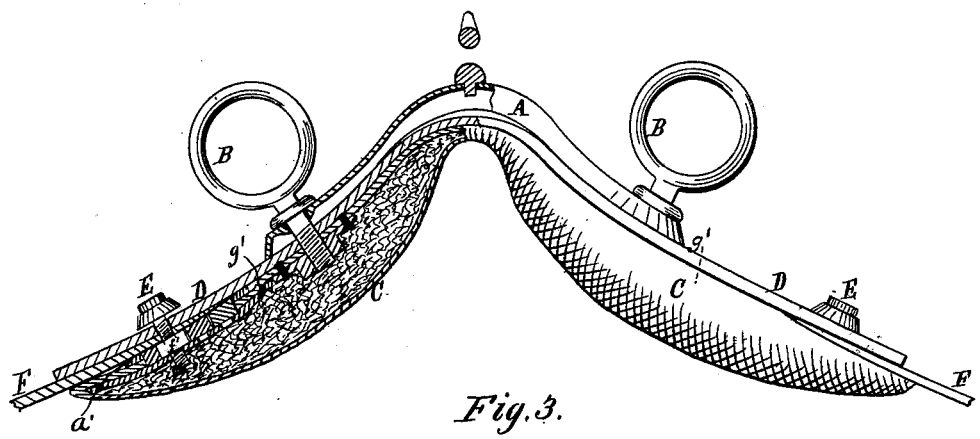
Figure 3:
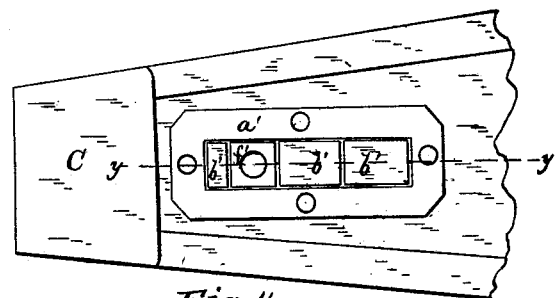
Figure 4:
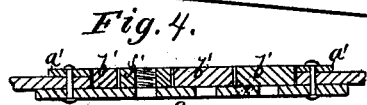

Figure 1 is a plan of the pad. Fig. 2 is a side view of the same, partly in section, on line $x\,x$ of Fig. 1. Fig. 3 is a plan of the metallic plate set within the pad. Fig. 4 is a section of the same through line $y\,y$ of Fig. 3.

Similar letters of reference indicate corresponding parts.

The object of this invention is to provide a harness-pad which may be adjusted to the back of a horse of any shape or size.

On the back of the pad C is the housing D. Within the pad, near each end thereof, are slotted metallic plates $a'\,a'$, preferably of zinc. Within the slots of each of these plates are fitted two or more squares of hard leather or other suitable material, $b'\,b'$, that still leave room enough in the slots for the nuts $f'$, into which enter the pad-screws E E, that pass down through the housing D and the skirts F F.

In order to adjust the pad, which, from the points $g'\,g'$ to its ends, is held against the housing and skirts only by the screws E E and their nuts, the screws are withdrawn and the relative positions of one or more of the squares $b'\,b'$ and of the nuts are changed; then the screws are reinserted in their respective nuts and screwed down. Thus, if it be desired to bring the ends of the pad closer together, in order to fit it to a small horse, the squares are moved down toward the lower ends of the slots, and the nuts $f'\,f'$ are placed in the upper ends thereof. Then, by inserting the screws and turning them down firmly, the ends of the pad are pressed inward toward each other.

To adjust the pad to a larger horse the relative positions of the nuts and squares are reversed, the nuts being set in the extreme outmost ends of the slots.

Within these two extremes there is a sufficient range of adjustment to meet all ordinary requirements.

Even if this method of absolute adjustment be dispensed with, the pad will adjust itself to the backs of horses of different sizes more readily than will any other, because the pad proper is detached at its ends from the housing, as shown.

The skirts F F may be held to the housing by the screws E E and terrets B B, or may be sewed thereto.

Having thus described my invention, I claim as new and desire to secure by Letters Patent—

In the construction of a harness-pad, the plates $a'\,a'$, squares $b'\,b'$, and nuts $f'\,f'$, in combination with the housing D and pad C, substantially as herein shown and described.

JACOB JOHNSON.

Witnesses:
JOSEPH ARNOLD,
J. F. RITCHHART.